United States Patent
Park (10) Patent No.: US 12,314,338 B2
(45) Date of Patent: May 27, 2025

(54) MULTI-URI-BASED QUEUE MANAGEMENT DEVICE AND METHOD THEREOF

(71) Applicant: STCLab. Co., Ltd., Seoul (KR)

(72) Inventor: Hyung Joon Park, Seoul (KR)

(73) Assignee: STCLab. Co., Ltd., Seould (KR)

( * ) Notice: Subject to any disclaimer, the term of this patent is extended or adjusted under 35 U.S.C. 154(b) by 0 days.

(21) Appl. No.: 18/425,145

(22) Filed: Jan. 29, 2024

(65) Prior Publication Data
US 2024/0220566 A1 Jul. 4, 2024

Related U.S. Application Data

(63) Continuation of application No. PCT/KR2023/018937, filed on Nov. 22, 2023.

(30) Foreign Application Priority Data
Dec. 30, 2022 (KR) .................. 10-2022-0190468

(51) Int. Cl.
 *G06F 16/958* (2019.01)
 *G06F 16/9532* (2019.01)
(52) U.S. Cl.
 CPC ........ *G06F 16/958* (2019.01); *G06F 16/9532* (2019.01)
(58) Field of Classification Search
 CPC .................... G06F 16/958; G06F 16/9532
 USPC ....................................... 715/234
 See application file for complete search history.

(56) References Cited

U.S. PATENT DOCUMENTS

| | | | | |
|---|---|---|---|---|
| 6,023,722 A * | 2/2000 | Colyer | ...... | H04L 9/40 709/201 |
| 6,314,463 B1 * | 11/2001 | Abbott | ...... | G06F 11/3433 709/227 |
| 2002/0027568 A1 * | 3/2002 | Nino | ...... | H04L 67/02 715/741 |
| 2011/0161980 A1 * | 6/2011 | English | ...... | H04L 47/70 718/105 |
| 2014/0046938 A1 * | 2/2014 | Li | ...... | G06F 16/955 707/727 |
| 2016/0094611 A1 * | 3/2016 | Chow | ...... | H04L 67/61 709/203 |
| 2016/0232468 A1 * | 8/2016 | Meiri | ...... | G06Q 10/06315 |
| 2017/0012843 A1 * | 1/2017 | Zaidi, III | ...... | H04L 43/0858 |
| 2023/0125273 A1 * | 4/2023 | Lee | ...... | G06Q 10/06311 705/7.29 |

FOREIGN PATENT DOCUMENTS

| | | |
|---|---|---|
| KR | 10-2014-0127888 A | 11/2014 |
| KR | 10-2017-0012540 A | 2/2017 |
| KR | 10-2021-0064434 A | 6/2021 |

OTHER PUBLICATIONS

"Notice of Preliminary Examination Result"; Office Action issued in KR 10-2022-0190468; mailed by the Korean Intellectual Property Office on Feb. 15, 2023.

* cited by examiner

*Primary Examiner* — Thu V Huynh
(74) *Attorney, Agent, or Firm* — Studebaker Brackett PLLC (57) ABSTRACT

Disclosed are a multi-URI-based queue management device and a method thereof. Access to a target server in one queue is integrated and managed even though the same website or web page is accessed through various platforms when the target server is overloaded, thereby securing equity/fairness between users (connectors).

11 Claims, 8 Drawing Sheets

FIG. 1

-- Prior Art --

MULTI-URI-BASED QUEUE MANAGEMENT DEVICE AND METHOD THEREOF

CROSS-REFERENCE TO RELATED APPLICATIONS

The present application is a continuation of International Patent Application No. PCT/KR2023/018937, filed on Nov. 22, 2023, which is based upon and claims the benefit of priority to Korean Patent Application No. 10-2022-0190468 filed on Dec. 30, 2022. The disclosures of the above-listed applications are hereby incorporated by reference herein in their entirety.

BACKGROUND

Embodiments of the present disclosure described herein relate to a queue management device and a method thereof, and more particularly, relate to a multi-uniform resource identifier (URI)-based queue management device and a method thereof.

Operators who operate target servers are classified into a cloud service provider (CSP) and a managed service provider (MSP). The CSP is a primary service provider such as Amazon Web Service (AWS), Microsoft, Google, IBM, Oracle, or the like. The MSP plays a role in secondary service distribution and consulting, intermediating customers with the CSP such as MegazoneCloud.

In detail, when the MSP operates an Amazon server, a customer needs to set the target server's resource specifications, or the like, but it is difficult for the customer to set the target server's resource specifications. Accordingly, the MSP plays a consulting role in the middle. Furthermore, the CSP only provides guidance, and the customer needs to decide the resource specifications.

Accordingly, when a target server is introduced for the first time or in a case of a service provider, it is difficult to know the appropriate resource specifications. Moreover, the MSP cannot help but consider spare resources due to temporary traffic increases (i.e., resources are allocated based only on overall trends or statistics), and thus it is difficult to allocate proper resources.

In the meantime, because administrators of companies providing web services through target servers need to maintain web servers in an appropriate resource state, the administrators are allocating more resources than necessary resource specifications for reasons of stability. However, although this may be desirable in terms of service stability, web servers allocated through the target servers are charged based on resource specifications and operating time, and thus this is not desirable in terms of cost efficiency.

As the number of concurrent users of a web server that provides a content service such as course registrations, concert reservations, and purchase events increases, the response speed of the server providing the content service may decrease or the service may be interrupted.

In this case, a queue is generated and managed by a queue management device (server) operating in conjunction with the target server. When a single event takes place on various platforms (roots) or several events occur simultaneously within one service, it may be advantageous or disadvantageous based on a platform selected by the user (connector) as each queue is created for each platform. Accordingly, issues related to equity/fairness may arise.

Accordingly, even though the same website or web page is accessed through various platforms when the target server is overloaded, there is a need to develop a technology for integration and management in one queue.

SUMMARY

Embodiments of the present disclosure provide a multi-URI-based queue management device capable of securing equity/fairness between users (connectors) by integrating and managing access to a target server in one queue even though the same website or web page is accessed through various platforms when the target server is overloaded, and a method thereof.

Problems to be solved by the present disclosure are not limited to the problems mentioned above, and other problems not mentioned will be clearly understood by those skilled in the art from the following description.

According to an embodiment, a multi-uniform resource identifier (URI)-based queue management device includes a communication module that communicates with an external device, a server module that creates and manages a queue in units of one segment where predetermined multiple URIs are registered, and creates a queue corresponding to a specific segment, in which a specific URI is registered, from among a plurality of segments when an access request for the specific URI is received from at least one user terminal through the communication module, and a control module that monitors an access status for a specific website or a specific web page providing a service based on a target server, and determines whether to activate the server module based on the monitored result.

According to an embodiment, a multi-URI-based queue management method performed by a device includes creating one segment where predetermined multiple URIs are registered, monitoring an access status by collecting and analyzing status information about a specific website or a specific web page providing a service based on a target server at a predetermined cycle, determining whether to activate a management operation depending on the monitored result, identifying a specific segment in which the specific URI is registered when an access request for a specific URI is received from at least one user terminal while the management operation is activated, and creating one queue corresponding to the specific segment.

Besides, a computer program stored in a computer-readable recording medium for implementing the present disclosure may be further provided.

In addition, a computer-readable recording medium for recording a computer program for implementing the present disclosure may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

The above and other aspects, features and advantages of the present disclosure will become apparent from the following description of the following embodiments given in conjunction with the accompanying drawings. The present disclosure, however, may be embodied in various different forms, and should not be construed as being limited only to the illustrated embodiments. Rather, these embodiments are provided as examples so that the present disclosure will be thorough and complete, and will fully convey the scope of the present disclosure to those skilled in the art. The present disclosure may be defined by the scope of the claims.

The terms used herein are provided to describe embodiments, not intended to limit the present disclosure. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the present disclosure.

Unless otherwise defined, all terms (including technical and scientific terms) used herein have the same meaning as commonly understood by those skilled in the art to which the present disclosure pertains. The terms, such as those defined in commonly used dictionaries, should not be interpreted in an idealized or overly formal sense unless expressly so defined herein.

The same reference numerals denote the same elements throughout the present disclosure. The present disclosure does not describe all elements of embodiments. Well-known content or redundant content in which embodiments are the same as one another will be omitted in a technical field to which the present disclosure belongs. The term "unit" or "module" used herein may refer to software or hardware such as field programmable gate array (FPGA) or application specific integrated circuit (ASIC), and the "unit" or "module" may perform some functions. However, the "unit" or "module" may be not limited to software or hardware. The "unit" or "module" may be configured to exist in an addressable storage medium or may be configured to operate one or more processors. Therefore, as an example, "units" or "module" may include various elements such as software elements, object-oriented software elements, class elements, and task elements, processes, functions, attributes, procedures, subroutines, program code segments, drivers, firmware, microcodes, circuits, data, databases, data structures, tables, arrays, and variables. Functions provided in "units" or "modules" and elements may be combined into a smaller number of "units" or "modules" and elements or may be divided into additional "units" or "modules" and elements.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, definitions of terms used in the description are as follows.

In the present disclosure, the description is limited to the providing device 300. However, the present disclosure may further include a server, a computer, and/or a portable terminal, or may be in a form of any one thereof.

Here, the server may be a server that processes information by communicating with an external device and may include an application server, a computing server, a database server, a file server, a game server, a mail server, a proxy server, and a web server.

For example, the computer may include a notebook computer, a desktop computer, a laptop computer, a tablet PC, a slate PC, and the like, which are equipped with a web browser.

For example, the portable terminal may be a wireless communication device that guarantees portability and mobility, and may include all kinds of handheld-based wireless communication devices such as a smartphone, a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-Code Division Multiple Access (W-CDMA), and Wireless Broadband Internet terminal (Wibro) terminal, and a wearable device such as a timepiece, a ring, a bracelet, an anklet, a necklace, glasses, a contact lens, or a head-mounted device (HMD).

Hereinafter, operating principles and embodiments of the present disclosure will be described with reference to the accompanying drawings.

Figure 1:
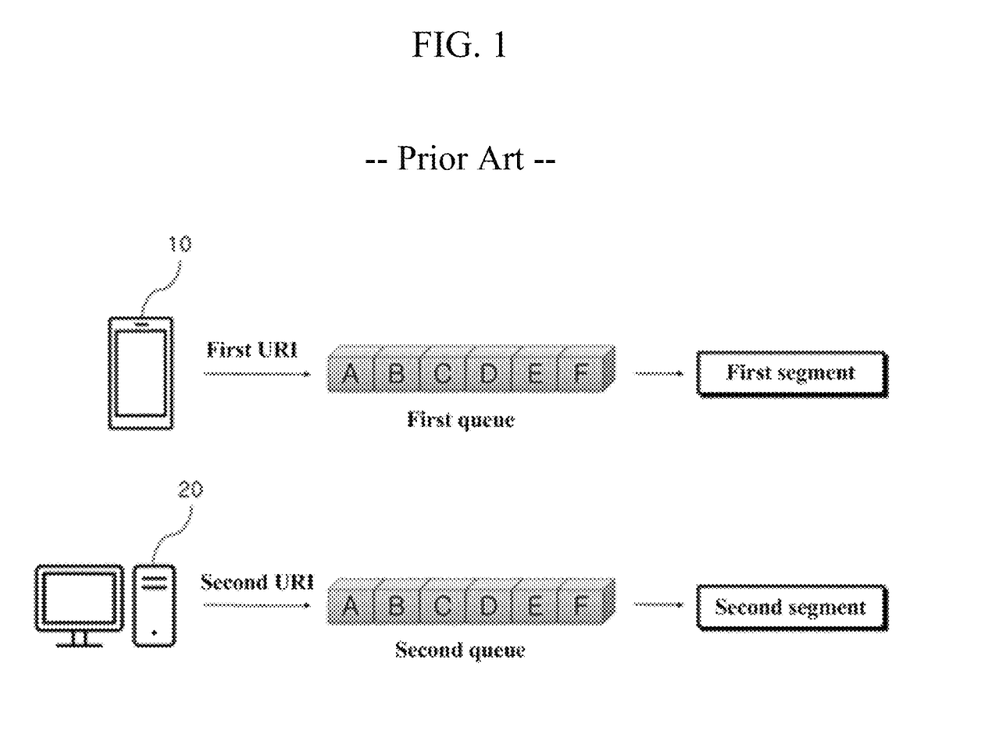
FIG. 1 is a diagram showing a queue management principle in a conventional queue management system.

FIG. 1 is a diagram showing a queue management principle in a conventional queue management system.

Referring to FIG. 1, when an access request for a first URI is received through a smart device 10, and an access request for a second URI is received through a computer device 20, a conventional queue management system identifies a segment in which each of the first URI and the second URI is registered. In this case, the two access requests may be received simultaneously or may be received at different time points. In the meantime, both the access request for the first URI and the access request for the second URI are associated with the same website or web page for providing a target server-based service.

When a first segment where the first URI is registered, and a second segment where the second URI is registered are identified, a queue for each segment is generated. In this case, because one URI is registered in one segment, a queue is generated and mapped onto one segment of each of the two URIs.

In other words, a first queue mapped onto a first segment and a second queue mapped onto a second segment are generated, and the access request for the first URI and a transaction for the second URI are processed based on the first queue and the second queue, respectively.

As described above, in the case of a user (connector) sending an access request to the same website or web page through the smart device 10, and a user sending an access request via the computer device 20, the transaction is processed based on different queues as each queue is created for the smart device 10 and the computer device 20, As a result, issues with equity/fairness arise as periods required for two users to access URIs are different from each other.

Figure 2:
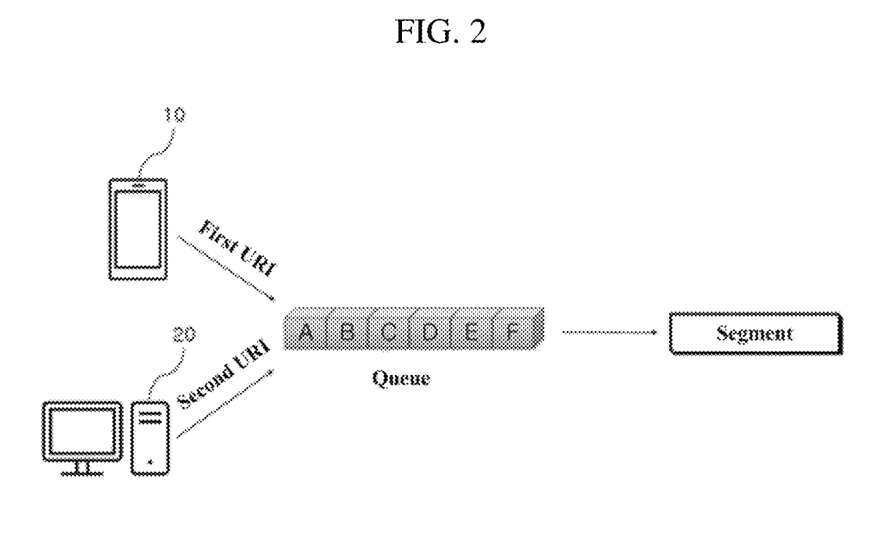
FIG. 2 is a diagram showing a queue management principle in a queue management system, according to an embodiment of the present disclosure.

FIG. 2 is a diagram showing a queue management principle in a queue management system, according to an embodiment of the present disclosure.

Referring to FIG. 2, when an access request for a first URI is received through the smart device 10 and an access request for a second URI is received through the computer device 20, the queue management system according to an embodiment of the present disclosure integrates and manages the first URI and the second URI, which are registered in the same segment into one queue. In this case, both the access request for the first URI and the access request for the second URI are associated with the same website or web page for providing a target server-based service.

In other words, multiple URIs may be registered in a segment according to an embodiment of the present disclosure, and one queue is created and managed for the multiple URIs. Here, multiple URIs may be classified depending on an access scheme or the device type of a user terminal 100 (the smart device 10 or the computer device 20) making a request for access to the web page.

Although FIG. 2 shows only the smart device 10 and the computer device 20 as the user terminal 100, this is only an example, and other devices may be included or replaced. Furthermore, the number of user terminals 100 included in the queue management system may be at least one or more, but is not limited thereto.

Figure 3:
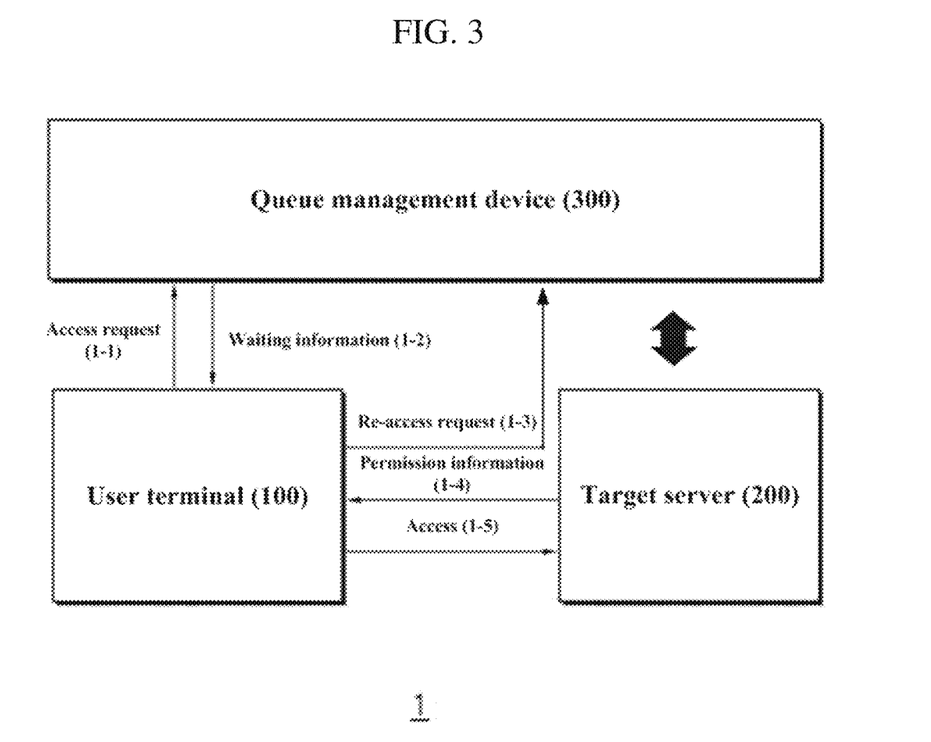
FIG. 3 is a diagram showing a network structure of a multi-URI-based queue management system, according to an embodiment of the present disclosure.

FIG. 3 is a diagram showing a network structure of a multi-URI-based queue management system, according to an embodiment of the present disclosure.

Referring to FIG. 3, a multi-URI-based queue management system 1 according to an embodiment of the present disclosure may be include a user terminal 100, a target server 200, and a queue management device 300.

The user terminal 100 may be a terminal of a user who wants to use (access) a specific web site providing a service based on the target server 200, or a specific web page within the specific web site, and the at least one or more user terminals 100 may be present. In other words, the user sends an access request for a specific web site or specific web page to the queue management device 300 through the user terminal 100.

In the meantime, as the queue management device 300 creates a queue for the user terminal 100, the user terminal 100 receives waiting information 1-2 from the queue management device 300. Afterward, the user terminal 100 waits for a specific period of time based on time-to-live (TTL) included in the waiting information 1-2 and then sends a re-access request 1-3 to the queue management device 300.

When access is impossible despite the re-access request, the user terminal 100 may receive waiting information generated at the corresponding time point from the queue management device 300. As a result, the user terminal 100 waits again for a specific period of time based on the TTL included in the re-generated waiting information and then transmits the re-access request 1-3 to the queue management device 300. In other words, the user terminal 100 repeats the access request operation until the access is permitted by the queue management device 300.

In the meantime, when access is permitted by the queue management device 300 based on the re-access request 1-3, the target server 200 transmits permission information 1-4 to the user terminal 100, and thus the user terminal 100 accesses to a specific web site or specific web page. This makes the web service available to the user.

In this case, the user terminal 100 sends a new access request and then receives the waiting information 1-2. Afterward, the user terminal 100 waits for a specific period based on TTL included in the waiting information 1-2 and then transmits a re-access request to the queue management device 300. When access is impossible despite the re-access request, the user terminal 100 may receive waiting information generated at the corresponding time point from the queue management device 300. As a result, the user terminal 100 waits again for a specific period based on the TTL included in the re-generated waiting information and then transmits the re-access request to the queue management device 300. In other words, the user terminal 100 repeats the access request operation until the access is permitted by the queue management device 300.

In the meantime, the user terminal 100 may be a computer, an ultra-mobile PC (UMPC), a workstation, a netbook, personal digital assistants (PDA), a portable computer, a web tablet, a wireless phone, a mobile phone, a smart phone, a pad, a smart watch, a wearable terminal, an e-book, a portable multimedia player (PMP), a portable game console, a navigation device, a black box or digital camera, other mobile communication terminals, or the like, on which a user is capable of installing and executing a plurality of desired application programs (i.e., applications). In other words, the user terminal 100 may be provided in various forms and is not limited thereto.

Also, the target server 200 may be a system for providing a web service based on a specific web site. The target server 200 may include a WEB server that provides a web page composed of hypertext markup language (HTML), a web application server (WAS) that processes application services for request messages sent from the web server, and a database (DB) that stores data capable of being provided in response to query statements, and may provide the web service in a cloud environment (AWS). Here, the web server is a cloud-based server assigned to a specific web site, and the at least one or more web servers may be present. In this case, the at least one or more web servers, the at least one or more WAS, and the at least one or more databases may be present.

When there is a surge of concurrent users (connectors) on a specific web site or specific web page, the response time of the target server 200 may be delayed due to insufficient network bandwidth.

The target server 200 is a device, which allocates and manages resources to provide a web service in a cloud environment (AWS), and is operated by cloud operators such as CSP and MSP.

The queue management device 300 operates in conjunction with the target server 200 to monitor an access status to one target based on the status information about the one target of the specific web site providing the service based on the target server 200 and the specific web page within the specific web site, and to detect an increase or decrease in traffic based on the access status identified depending on the monitored results. Here, the status information may be information including the access status of the user terminal 100 to a specific web site or specific web page identified based on the resource status of the web server.

In addition, the queue management device 300 determines whether to activate a management operation such that users sequentially access a server even though there is a surge of the users (an activation command may be delivered depending on the determination), and creates a queue for at least one user terminal requesting access while the management operation is activated, to sequentially process and manage transactions. Here, the access status may be monitored by collecting and analyzing the status information at a predetermined period.

The queue management device 300 may automatically control the number of allowable entries of user terminals accessing a specific web site (an application) or a specific web page depending on a RuleSet setting value. For example, the queue management device 300 sets the number of allowable entries to a predetermined threshold value and compares the number of allowable entries with the number of at least one user terminal currently accessing the specific web site. When the number of at least one user terminal thus currently accessed exceeds (reaches) a predetermined threshold value, the queue management device 300 determines to activate the management operation. Here, the number of at least one user terminal thus currently accessed is one of pieces of information capable of being identified by monitoring the access status.

Figure 4:
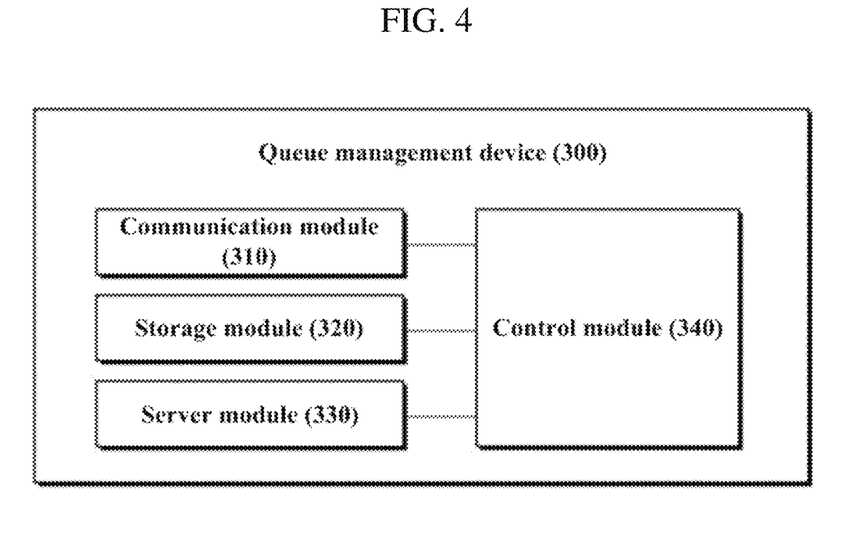
FIG. 4 is a diagram showing a configuration of a multi-URI-based queue management device, according to an embodiment of the present disclosure.

FIG. 4 is a diagram showing a configuration of a multi-URI-based queue management device, according to an embodiment of the present disclosure.

Referring to FIG. 4, a multi-URI-based queue management device 300 according to an embodiment of the present disclosure may include a communication module 310, a storage module 320, a server module 330, and a control module 340.

The communication module 310 may performs wired or wireless communication with the user terminal 100, the target server 200 and at least one external device (a server, etc.). In particular, when wireless communication is performed, wireless signals are exchanged over a communication network based on wireless Internet technologies.

The communication module 310 may include one or more components that enable communication with an external device. The communication module 310 may include, for example, at least one of a wired communication module, a wireless communication module, and a short-range communication module, and may transmit and receive signals based on the at least one communication module.

Here, in addition to various wired communication modules such as a Local Area Network (LAN) module, a Wide Area Network (WAN) module, or a Value Added Network (VAN) module, the wired communication module may include a variety of cable communication modules such as Universal Serial Bus (USB), High Definition Multimedia Interface (HDMI), Digital Visual Interface (DVI), recommended standard (RS-232), power line communication, or plain old telephone service (POTS).

In addition to a Wifi module and a Wireless broadband (WiBro) module, the wireless communication module may include a wireless communication module that supports various wireless communication methods such as global System for Mobile Communication (GSM), Code Division Multiple Access (CDMA), Wideband Code Division Multiple Access (WCDMA), universal mobile telecommunications system (UMTS), Time Division Multiple Access (TDMA), Wireless LAN (WLAN), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), 4G, 5G, 6G, or the like.

The short-range communication may be used for short range communication, and may support short-range communication by using at least one of Bluetooth™, radio frequency identification (RFID), infrared data association (IrDA), ultra wideband (UWB), ZigBee, near field communication (NFC), Wireless-Fidelity (Wi-Fi), Wi-Fi Direct, and wireless universal serial bus (Wireless USB) technologies.

In detail, the communication module 310 collects status information from the target server 200 based on wired or wireless communication, receives an access request 1-1 from the user terminal 100, and transmits the waiting information 1-2 as a response to the access request. In addition, the communication module 310 exchanges various types of information with at least one external device.

The storage module 320 stores data and/or various types of information for supporting various functions of the queue management device 300. The storage module 320 may store a plurality of application programs (or applications) running in the queue management device 300, data for an operation of the queue management device 300, and instructions. At least part of the application programs may be downloaded from an external server through wireless communication. In the meantime, the application program may be stored in at least one memory provided in the storage module 320, may be installed in the queue management device 300, and may be driven so as to perform an operation (or function) executed by at least one processor of the control module 340.

In the meantime, the at least one memory may include a storage medium of at least one type of a flash memory type, a hard disk type, a multimedia card micro type, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. Besides, the memory may store information temporarily, permanently, or semi-permanently, and may be provided in an embedded type or a removable type.

The storage module 320 may be equipped with a database for managing a queue based on multiple URIs. This database may store basic information, status information, or the like for at least one respective user (a customer company, a connector, or the like). To this end, the storage module 320 may operate in conjunction with the target server 200. Moreover, the storage module 320 may store at least one process for managing a queue based on the multiple URIs.

The server module 330 creates and manages the queue in units of one segment where predetermined multiple URIs are registered. Here, the segment may be a virtual point used to manage a point (space) where overload occurs. Furthermore, each of the multiple URIs may include link information according to an access scheme. The number of URIs capable of being registered in one segment may be limited to the predetermined number. In other words, the user terminal 100 has a separate URI for the same web site or web page based on a scheme of accessing a specific web site or specific web page, and registers the URI in one segment. For example, the access scheme may include at least one of whether the user terminal 100 has a first access scheme based on the smart device 10, whether the user terminal 100 has a second access scheme based on the computer device 20, and whether the user terminal 100 has a third access scheme based on dedicated application. However, this is only one embodiment, and other access schemes may be added or some access schemes may be excluded, but this is not limited thereto.

Multiple URIs registered in one segment may be grouped by various criteria. For example, these URIs may be registered in one segment by analyzing the URIs where the page response speed from the target server 200 to the user terminal 100 is slower than a specific speed. Besides, the URIs may be registered in one segment by analyzing the URIs frequently called from the user terminal 100. Accordingly, the queue management device 300 according to an embodiment of the present disclosure may manage a queue based on various criteria.

Moreover, one segment may be managed by assigning a weight to each URI. For example, when the target server 200 responds to the requested page, the load received by the target server 200 may vary depending on the access scheme. Accordingly, for example, assuming that the queue value for one segment is 100, a weight of '1' per URI may be assigned to URIs requested through the smart device 10, and a weight of '2' per URI may be assigned to URIs requested through the computer device 20. Accordingly, the queue management device 300 according to an embodiment of the present disclosure may manage the load on the target server 200.

The queue management device 300 may propose a criterion for grouping multiple URIs registered in one segment through an artificial intelligence model learned based on previously collected data.

In detail, the server module 330 may be activated depending on the activation command. When an access request for a specific URI is received from at least one user terminal through the communication module 310 while the server module 330 is activated, the server module 330 identifies the specific segment, in which the specific URI is registered, from among a plurality of segments and creates a queue for at least one user terminal. In other words, the server module 330 creates a queue corresponding to the specific segment in which the specific URI is registered. In this case, the server module 330 creates a queue corresponding to that specific segment by identifying the specific URI for each access request to create a queue, and identifying the specific segment, in which the identified specific URI is registered, from among the plurality of segments.

In the meantime, when the segment, in which the identified URI is registered, from among the plurality of segments is not identified, the server module 330 creates and adds a new segment, registers the identified URI in the new segment, and then creates a queue for the new segment.

Furthermore, the server module 330 may create a queue by generating waiting information about at least one respective user terminal. The waiting information may be transmitted to the user terminal 100 under the control of the control module 340. The waiting information may include information about a waiting key, a waiting order, a waiting time, and TTL of the corresponding user terminal, which are predicted based on the number of at least one user terminal, and the resources of the target server 200. To this end, the queue management device 300 may further include a separate generation module (not shown) that generates the waiting information.

The control module 340 may perform an operation of managing a queue based on multiple URIs by using at least one processor. The control module 330 may allow all components within the queue management device 300 to process signals, data, information, or the like, which is input or output, or may perform various processes by executing commands, algorithms, and application programs stored in at least one memory.

That is, the control module 340 controls not only all operations, which are performed by the queue management device 300 described above based on FIGS. 3 and 4, but also all operations performed in each component that constitutes the queue management device 300.

The control module 340 may control the number (active user) of at least one user terminal capable of accessing a specific web site or specific web page based on a predetermined threshold value (B). For example, the control module 340 immediately allows access to at least one user terminal (hereinafter referred to as a "first user terminal"), which sent an access request, until the number (the number (A) of accessed user terminals) of at least one user terminal (hereinafter referred to as a "second user terminal") thus currently accessed reaches the predetermined threshold value (B) (i.e., until the server module 330 is activated). In the meantime, the server module 330 creates a queue based on at least one first user terminal transmitting an access request by delivering an activation command to the server module 330 after the number (A) of accessed user terminals reaches the predetermined threshold value (B), and processes a transaction by sequentially allowing access to the first user terminal present in the queue. In this case, the control module 340 processes the transaction based on TTL of the first user terminal.

To this end, the control module 340 operating in conjunction with the target server 200 may collect and analyze status information about one target among the specific web site and the specific web page within the specific web site at a predetermined cycle, may monitor the access status for the one target, and may determine whether traffic increases or decreases, as well as the number of at least one second user terminal currently accessed, based on the access status identified based on the monitored results.

The server module 330 described above may be linked to at least one of a predetermined button, page, and session within a specific web site. The control module 340 may control activation of the server module 330 only for the linked space, or may control the activation of the server module 330 for all spaces where traffic increases or decreases within the specific web site.

In this case, the control module 340 may allow the server module 330 to be automatically activated based on setting conditions.

Figure 5:
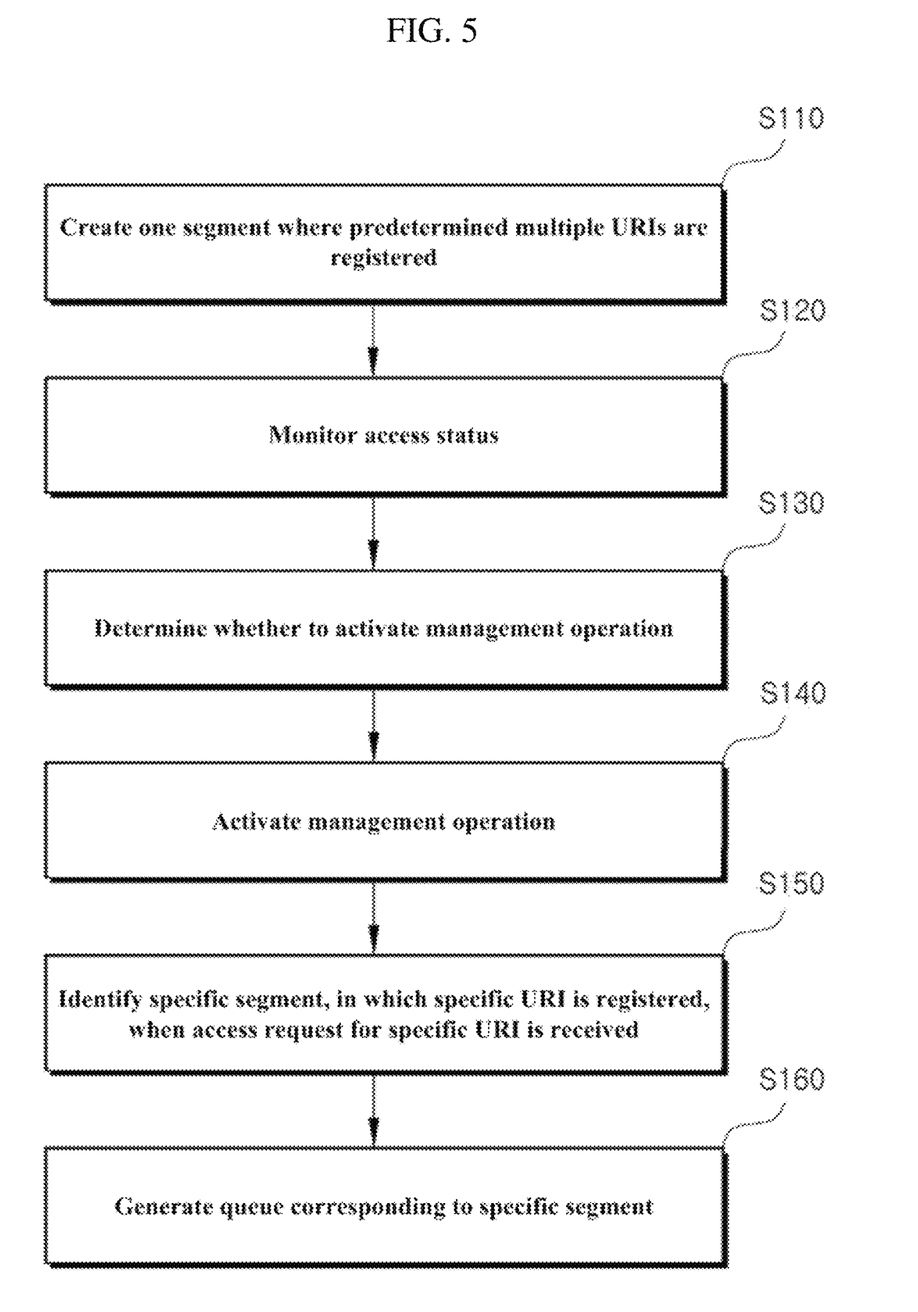
FIG. 5 is a flowchart for describing a multi-URI-based queue management method, according to an embodiment of the present disclosure.

FIG. 5 is a flowchart for describing a multi-URI-based queue management method, according to an embodiment of the present disclosure.

Referring to FIG. 5, the queue management device 300 creates one segment where predetermined multiple URIs are registered (S110), and monitors an access status of a specific web site for providing a target server-based service or a specific web page within the specific web site (S120).

Next, the queue management device 300 determines whether to activate the server module 330 based on the monitored result (S130). When it is determined to activate the server module 330, the queue management device 300 delivers an activation command to the server module 330 to activate management operation (S140).

Next, when an access request for a specific URI is received from the at least one user terminal 100 while the server module 330 is activated in step S140, the queue management device 300 identifies the specific URI and the specific segment, in which the specific URI is registered, based on the access request (S150).

Next, the queue management device 300 generates waiting information for the at least one user terminals 100 and creates a queue corresponding to the specific segment (S160).

In the meantime, although not shown in FIG. 5, the queue management device 300 sequentially processes transactions based on TTL for the at least one user terminals 100 based on the created queue. In this case, the TTL may be identified through respective waiting information generated in step S160. The respective waiting information may include at least one TTL for the at least one user terminal 100.

Figure 6:
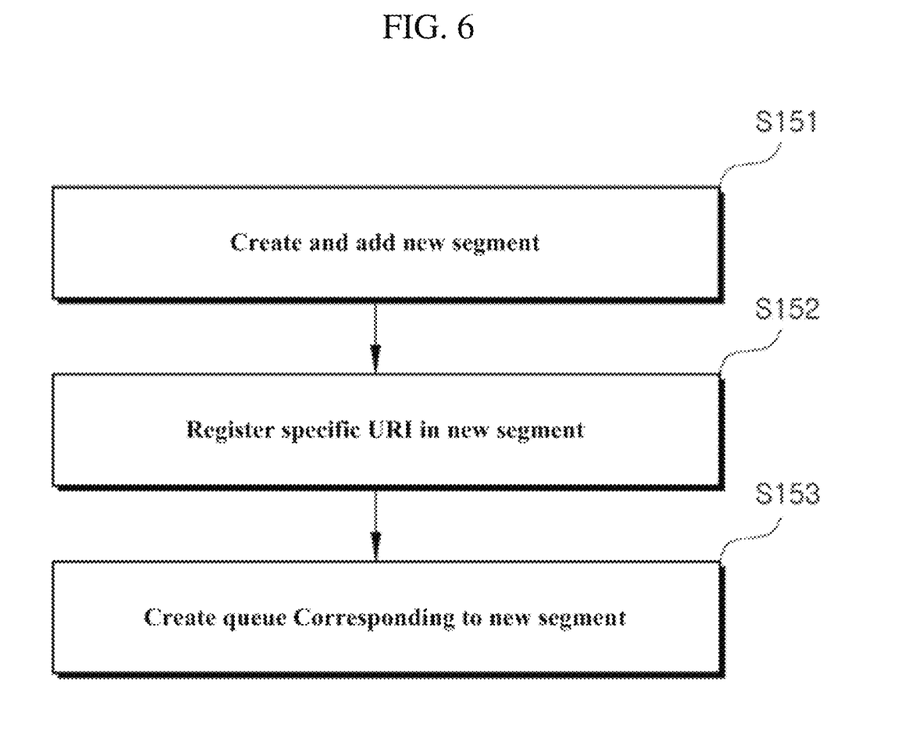
FIG. 6 is a flowchart illustrating a specific operation in which a management module identifies a specific segment, in which a specific URI is registered, according to an embodiment of the present disclosure.

FIG. 6 is a flowchart illustrating a specific operation in which a management module identifies a specific segment, in which a specific URI is registered, according to an embodiment of the present disclosure, and specifically shows an operation performed when the specific segment in which the corresponding URI is registered is not identified in step S150 of FIG. 5.

Referring to FIG. 6, when a specific segment where a specific URI is registered is not identified in step S150, the queue management device 300 creates and adds a new segment for a specific web site or specific web page before creating a queue (S151).

Next, the queue management device 300 registers the specific URI in the new segment created in step S151 (S152), and creates waiting information for the at least one user terminals 100 and creates a queue for the new segment (S153).

Steps S151 to S153 described above may be performed instead of step S160 of FIG. 5.

Figure 7:
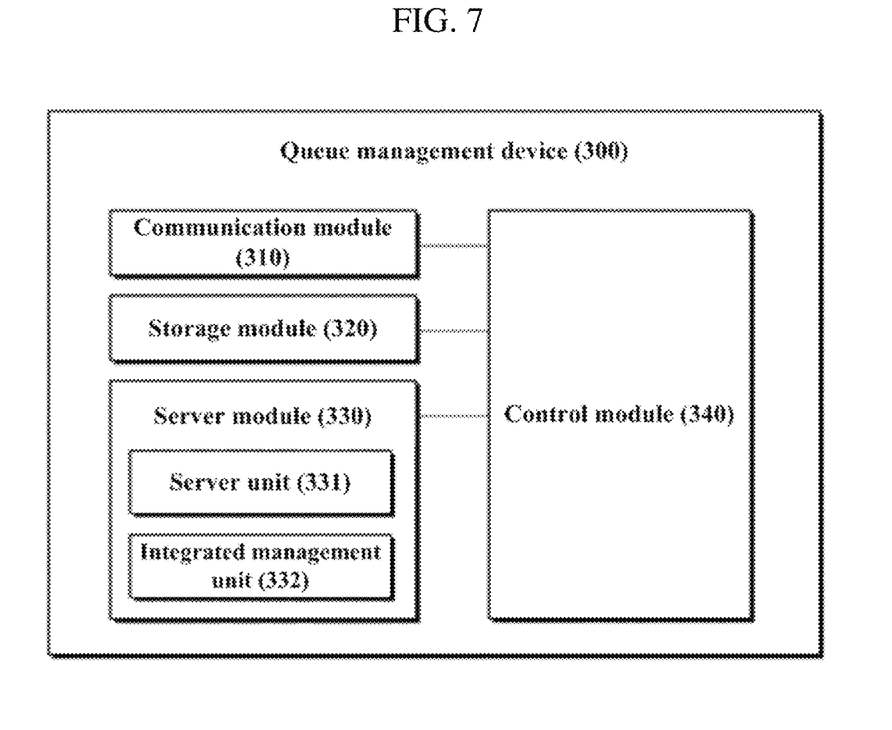
FIG. 7 is a diagram showing a configuration of a multi-URI-based queue management device, according to another embodiment of the present disclosure.

FIG. 7 is a diagram showing a configuration of a multi-URI-based queue management device, according to another embodiment of the present disclosure.

Referring to FIG. 7, the server module 330 of the queue management device 300 may include a server unit 331 and an integrated management unit 332.

First of all, the server unit 331 includes a plurality of servers that distribute and process access requests in an access scheme (an access path). For example, the server unit 331 may include a first server for processing at least one first URI based on a first access scheme, and a second server for processing at least one second URI based on a second access scheme. In this case, each of the at least one first URI and the at least one second URI may be mapped onto each other with respect to the same web page. In other words, even when the same event occurs on a web page, URIs are different depending on the access scheme, but each URI (i.e., multiple URIs) is mapped, registered, and managed in one segment.

When an access request for a plurality of servers is an access request for one of predetermined multiple URIs registered in the same segment, although they are distributed to different servers, the segments are the same as each other. Accordingly, the integrated management unit 332 creates, integrates, and manages one queue for the segment. In other words, the integrated management unit 332 creates, integrates, and manages one queue corresponding to an access request for the plurality of servers.

Figure 8:
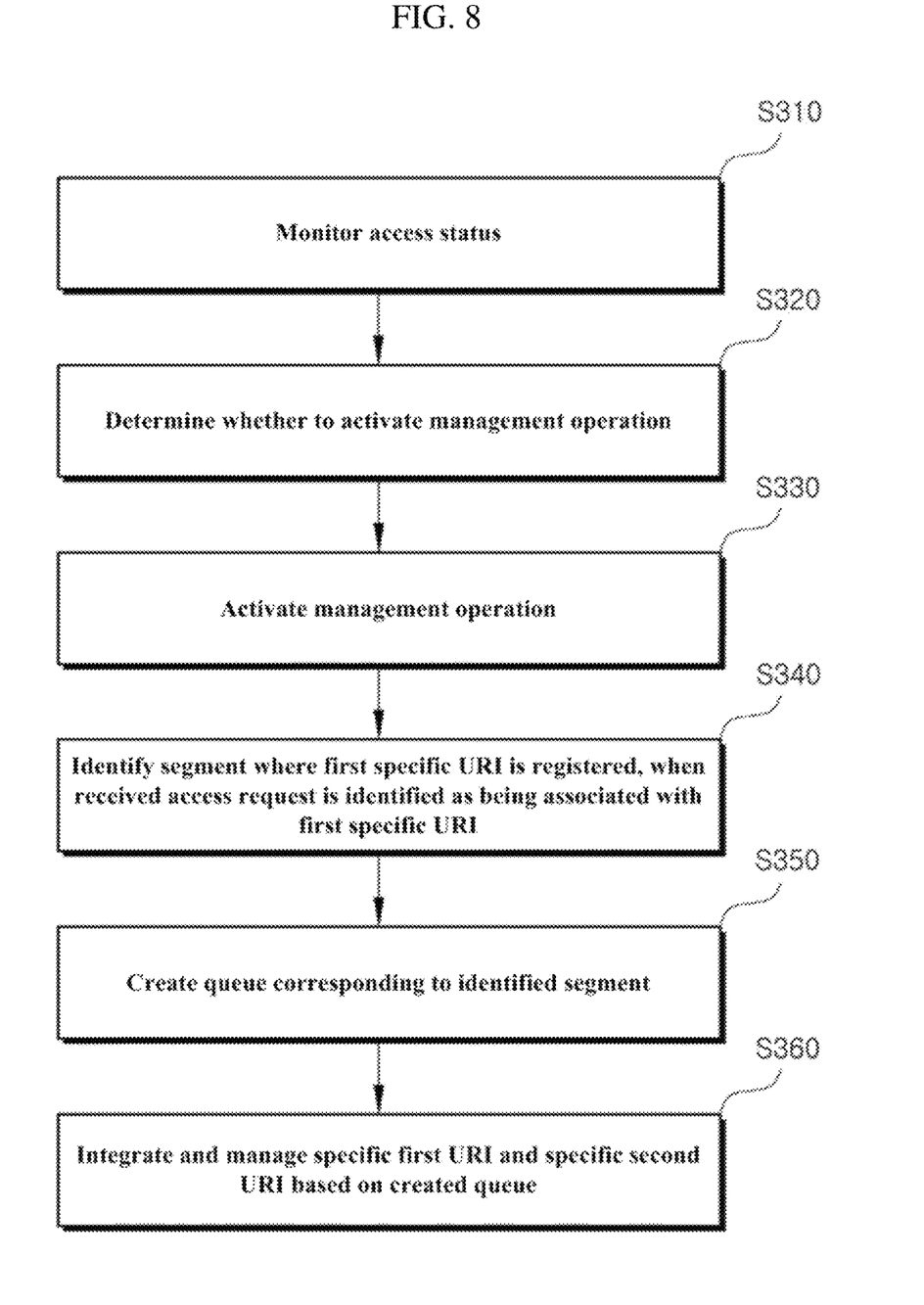
FIG. 8 is a flowchart for describing a multi-URI-based queue management method, according to another embodiment of the present disclosure.

FIG. 8 is a flowchart for describing a multi-URI-based queue management method, according to another embodiment of the present disclosure.

Referring to FIG. 8, steps S310 to S330 are the same as steps S120 to S140 of FIG. 5, and thus detailed description thereof will be omitted to avoid redundancy.

In this case, after step S330, when an access request received from the at least one user terminal 100 is identified as being associated with a first specific URI, the queue management device 300 identifies a segment where the first specific URI is registered (S340), and creates a queue corresponding to the identified segment (S350).

Next, afterward, when the access request received from the at least one user terminal 100 is identified as being associated with a specific second URI, and the specific second URI is simultaneously identified as being registered in the same segment as the specific first URI, a queue for the identified segment is created in step S350. Accordingly, the queue management device 300 integrates and manages the specific first URI and the specific second URI based on the queue (S360).

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions executing the method, and the functions may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The stored medium refers not to a medium, such as a register, a cache, or a memory, which stores data for a short time but to a medium that stores data semi-permanently and is read by a device. Specifically, for example, the stored media include, but are not limited to, ROM, RAM, CD-ROM, magnetic tape, floppy disk, optical data storage device, and the like. That is, the program may be stored in various recording media on various servers, which the computer may access, or in various recording media on the computer of the user. Further, the media may be distributed in computer systems connected over a network such that codes readable by the computer are stored in a distributed manner.

Steps or operations of the method or algorithm described with regard to an embodiment of the present disclosure may be implemented directly in hardware, may be implemented with a software module executable by hardware, or may be implemented by a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the present disclosure pertains.

Although an embodiment of the present disclosure are described with reference to the accompanying drawings, it will be understood by those skilled in the art to which the present disclosure pertains that the present disclosure may be carried out in other detailed forms without changing the scope and spirit or the essential features of the present disclosure. Therefore, the embodiments described above are provided by way of example in all aspects, and should be construed not to be restrictive.

According to the above-mentioned problem solving means of the present disclosure, it is possible to secure equity/fairness between users (connectors) by integrating and managing access to a target server in one queue even though the same website or web page is accessed through various platforms when the target server is overloaded.

Effects of the present disclosure are not limited to the effects mentioned above, and other effects not mentioned will be clearly understood by those skilled in the art from the following description.

While the present disclosure has been described with reference to embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A multi-uniform resource identifier (URI)-based queue management device, the device comprising:
   a communication module configured to communicate with external devices including multiple user terminals;
   a server module configured to integrate registrations of predetermined multiple URIs into one segment, and create and manage a queue corresponding to the one segment where the predetermined multiple URIs of the integrated registrations are registered, wherein the predetermined multiple URIs of the integrated registrations are received from the multiple user terminals, are requesting access to a same website or a same web page, and are having a same characteristic,
   wherein the server module is further configured to, when an access request for a specific URI is received from at least one user terminal, among the multiple user terminals, through the communication module, create a specific queue corresponding to a specific segment, while the sever module is activated in which the specific URI is registered, from among a plurality of segments; and
   a control module configured to determine whether to activate the server module based on a result of monitoring an access status for a specific website or a specific web page based on a target server,
   wherein the predetermined multiple URIs of the integrated registrations are distinguished from each other depending on an access scheme to the same website or the same web page,
   wherein a weight depending on the access scheme or a device type of the user terminal is differently assigned to each of the predetermined multiple URIs of the integrated registrations, and the server module is further configured to manage the specific queue based on weights of the user terminals registered in the specific queue, and
   wherein the predetermined multiple URIs of the integrated registrations have the same characteristic that page response speed from the target server to a respective user terminal is slower than a specific speed.

2. The device of claim 1, wherein the server module is configured to:
   generate waiting information about the at least one user terminal, and
   wherein the waiting information includes information about a waiting key, a waiting order, a waiting time, and time-to-live (TTL) of a corresponding user terminal, which are predicted based on the number of at least one user terminal and resources of the target server.

3. The device of claim 2, wherein each of the predetermined multiple URIs includes link information according to the access scheme.

4. The device of claim 3, wherein the server module is configured to:
   a server unit including a plurality of servers that are distributed according to the access scheme and perform processing; and
   an integrated management unit configured to create, integrate, and manage one queue corresponding to an access request for the plurality of servers when the access request for the plurality of servers is an access request for one of the predetermined multiple URIs registered in the same segment.

5. The device of claim 4, wherein the server unit includes:
   a first server configured to process at least one first URI based on a first access scheme; and
   a second server configured to process at least one second URI based on a second access scheme,
   wherein the at least one first URI and the at least one second URI are mapped onto each other with respect to the same web page.

6. The device of claim 5, wherein the integrated management unit is configured to:
   when the access request is identified to be associated with a first specific URI, identify a segment in which the first specific URI is registered; and
   create a queue corresponding to the identified segment and integrate and manage the first specific URI and a second specific URI mapped onto the first specific URI.

7. The device of claim 1, wherein the server module is configured to:
   when the segment, in which the specific URI is registered, from among the plurality of segments is not identified, create and add a new segment; and
   register the specific URI in the new segment and then create a queue corresponding to the new segment.

8. The device of claim 7, wherein registration of the predetermined multiple URIs is restricted such that the number of the predetermined multiple URIs is a predetermined number.

9. The device of claim 1, wherein the predetermined multiple URIs of the integrated registrations have the same characteristic that frequency of requesting access to the same website or the same web page from a respective user terminal is greater than a specific value.

10. A multi-URI-based queue management method performed by a multi-uniform resource identifier (URI)-based queue management device that communicates with external devices including multiple user terminals, the method comprising:

integrating registrations of predetermined multiple URIs into one segment, wherein the predetermined multiple URIs of the integrated registrations are received from the multiple user terminals, are requesting access to a same website or a same web page, and are having a same characteristic, monitoring an access status by collecting and analyzing status information about a specific website or a specific web page based on a target server at a predetermined cycle;

determining whether to activate a management operation depending on a result of the monitoring;

when an access request for a specific URI is received from at least one user terminal, among the multiple user terminal, while the management operation is activated, identifying a specific segment in which the specific URI is registered; and creating one queue corresponding to the specific segment where the predetermined multiple URIs of the integrated registrations are registered, wherein the predetermined multiple URIs of the integrated registrations are distinguished from each other depending on an access scheme to the same website or the same web page, wherein a weight depending on the access scheme or a device type of the user terminal is differently assigned to each of the predetermined multiple URIs of the integrated registrations, and the queue is managed based on weights of the user terminals registered in the queue, and wherein the predetermined multiple URIs of the integrated registrations have the same characteristic that page response speed from the target server to a respective user terminal is slower than a specific speed.

11. A computer-readable recording medium storing a program combined with a computer being a piece of hardware to execute a multi-URI-based queue management method performed by the device of claim 10.

* * * * *